United States Patent
Inoue et al.

(10) Patent No.: US 10,386,925 B2
(45) Date of Patent: Aug. 20, 2019

(54) TACTILE SENSATION PROVIDING APPARATUS AND CONTROL METHOD FOR TACTILE SENSATION PROVIDING APPARATUS

(75) Inventors: Hiroshi Inoue, Tokyo (JP); Kenji Kono, Tokyo (JP); Tomotake Aono, Tokyo (JP); Jun Takeda, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 716 days.

(21) Appl. No.: 13/392,871

(22) PCT Filed: Aug. 23, 2010

(86) PCT No.: PCT/JP2010/005187
§ 371 (c)(1),
(2), (4) Date: Feb. 27, 2012

(87) PCT Pub. No.: WO2011/024435
PCT Pub. Date: Mar. 3, 2011

(65) Prior Publication Data
US 2012/0162114 A1 Jun. 28, 2012

(30) Foreign Application Priority Data

Aug. 27, 2009 (JP) ................................ 2009-197437
Jun. 30, 2010 (JP) ................................ 2010-149060

(51) Int. Cl.
*G06F 3/041* (2006.01)
*G06F 3/01* (2006.01)

(52) U.S. Cl.
CPC ............ *G06F 3/016* (2013.01); *G06F 3/0414* (2013.01); *G06F 3/0416* (2013.01)

(58) Field of Classification Search
CPC ....... G06F 3/041; G06F 3/016; G06F 3/04812
(Continued)

(56) References Cited

U.S. PATENT DOCUMENTS 5,854,625 A 12/1998 Frisch et al.
6,429,846 B2 8/2002 Rosenberg et al.
(Continued)

FOREIGN PATENT DOCUMENTS

CN 101320303 A 12/2008
CN 101373413 A 2/2009
(Continued)

OTHER PUBLICATIONS

An Office Action issued by the Korean Patent Office dated Dec. 30, 2013, which corresponds to Korean Patent Application No. 10-2012-7005078 and is related to U.S. Appl. No. 13/392,871; with English language statement of relevance.
(Continued)

*Primary Examiner* — Stacy Khoo
(74) *Attorney, Agent, or Firm* — Studebaker & Brackett PC

(57) ABSTRACT

For providing a tactile sensation regardless of an input position of a user when receiving a pressure at which the tactile sensation is to be provided, The tactile sensation providing apparatus includes: a load detection unit configured to detect a different pressure load depending on a pushed position even when an object presses by a uniform pressure a touch face of a touch sensor to detect a touch input; a tactile sensation providing unit which provides the tactile sensation to the object pressing the touch face of the touch sensor; and a control unit which controls according to the pushed position on the touch face such that the tactile sensation providing unit provides the tactile sensation to the pressing object when the pressing object, applying the uniform pressure, presses any position on the touch face for providing the tactile sensation.

12 Claims, 13 Drawing Sheets

(58) Field of Classification Search
USPC .................. 345/173–178; 178/18.01–18.09
See application file for complete search history.

(56) References Cited

U.S. PATENT DOCUMENTS

| | | | |
|---|---|---|---|
| 2002/0033795 A1* | 3/2002 | Shahoian | G06F 1/1616 345/156 |
| 2002/0149561 A1 | 10/2002 | Fukumoto et al. | |
| 2008/0202824 A1 | 8/2008 | Philipp et al. | |
| 2008/0238884 A1 | 10/2008 | Harish | |
| 2008/0296072 A1 | 12/2008 | Takashima et al. | |
| 2008/0303799 A1 | 12/2008 | Schwesig et al. | |
| 2009/0267902 A1* | 10/2009 | Nambu | G06F 3/016 345/173 |
| 2010/0045624 A1* | 2/2010 | Hisatsugu | B60H 1/00985 345/173 |
| 2010/0220065 A1* | 9/2010 | Ma | G06F 3/016 345/173 |
| 2010/0328229 A1* | 12/2010 | Weber | G06F 1/1626 345/173 |

FOREIGN PATENT DOCUMENTS

| | | | |
|---|---|---|---|
| JP | H6-139004 A | 5/1994 | |
| JP | H10-293644 A | 11/1998 | |
| JP | H11-212725 A | 8/1999 | |
| JP | 2003-288158 A | 10/2003 | |
| JP | 2005-258666 A | 9/2005 | |
| JP | 2007-065814 A | 3/2007 | |
| JP | WO 2007034591 A1 * | 3/2007 | ............ G06F 3/016 |
| JP | 04-046095 B2 | 2/2008 | |
| JP | 2008-130055 A | 6/2008 | |
| JP | 2008-198205 A | 8/2008 | |
| KR | 10-2008-0075804 A | 8/2008 | |
| WO | 03/038800 A1 | 5/2003 | |
| WO | 2010/009552 A1 | 1/2010 | |

OTHER PUBLICATIONS

Japanese Office Action "Notification of Reasons for Refusal" dated Mar. 9, 2010, which corresponds to Japanese Patent Application No. 2009-197437 and is related to U.S. Appl. No. 13/392,871 with translation.
Japanese Office Action "Official Decision of Rejection" dated Jul. 27, 2010, which corresponds to Japanese Patent Application No. 2009-197437 and is related to U.S. Appl. No. 13/392,871 with translation.
Japanese Office Action "Notification of Reasons for Refusal" dated Feb. 19, 2013, which corresponds to Japanese Patent Application No. 2010-241403 and is related to U.S. Appl. No. 13/392,871 with translation.
The extended European Search Report dated Feb. 19, 2013, which corresponds to EP Application No. 10811494.3-1960 and is related to U.S. Appl. No. 13/392,871.
"Notification of the First Office Action" issued by the State Intellectual Property Office of China dated Feb. 8, 2014, which corresponds to Chinese Patent Application No. 201080038141.2 and is related to U.S. Appl. No. 13/392,871; with English language translation.
An Office Action issued by the Korean Patent Intellectual Property Office dated May 28, 2013, which corresponds to Korean Patent Application No. 10-2012-7005078 and is related to U.S. Appl. No. 13/392,871; with translation.
International Search Report; PCT/JP2010/005187; dated Oct. 5, 2010.
An Office Action; "Notice of Reason for Rejection," issued by the Japanese Patent Office dated Feb. 18, 2014, which corresponds to Japanese Patent Application No. 2010-149060 and is related to U.S. Appl. No. 13/392,871; with English language concise explanation.
An Office Action, "Communication pursuant to Article 94(3) EPC," issued by the European Patent Office dated Jun. 18, 2014, which corresponds to European Patent Application No. 10 811 494.3-1954 and is related to U.S. Appl. No. 13/392,871.
An Office Action; "Notice of Reasons for Rejection," issued by the Japanese Patent Office dated May 20, 2014, which corresponds to Japanese Patent Application No. 2010-149060 and is related to U.S. Appl. No. 13/392,871; with English language concise explanation.
"Notification of the Second Office Action" issued by the State Intellectual Property Office of China dated Sep. 19, 2014, which corresponds to Chinese Patent Application No. 201080038141.2 and is related to U.S. Appl. No. 13/392,871; with English language translation.
EP Notice of Opposition dated Apr. 20, 2017, from corresponding EP Appl No. 10811494.3, with English translation, 36 pp.

* cited by examiner

FIG. 2
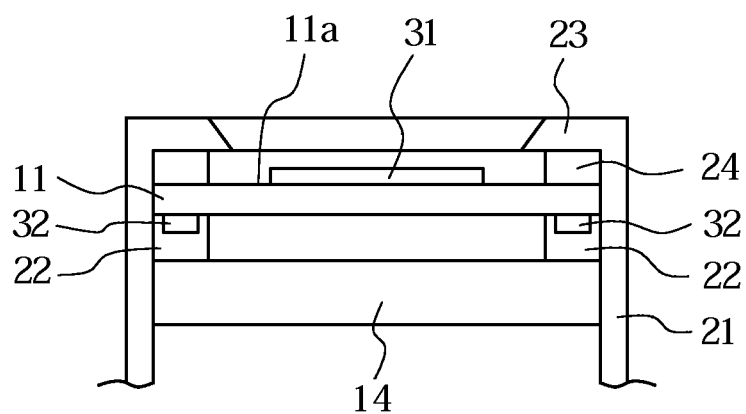
(a)
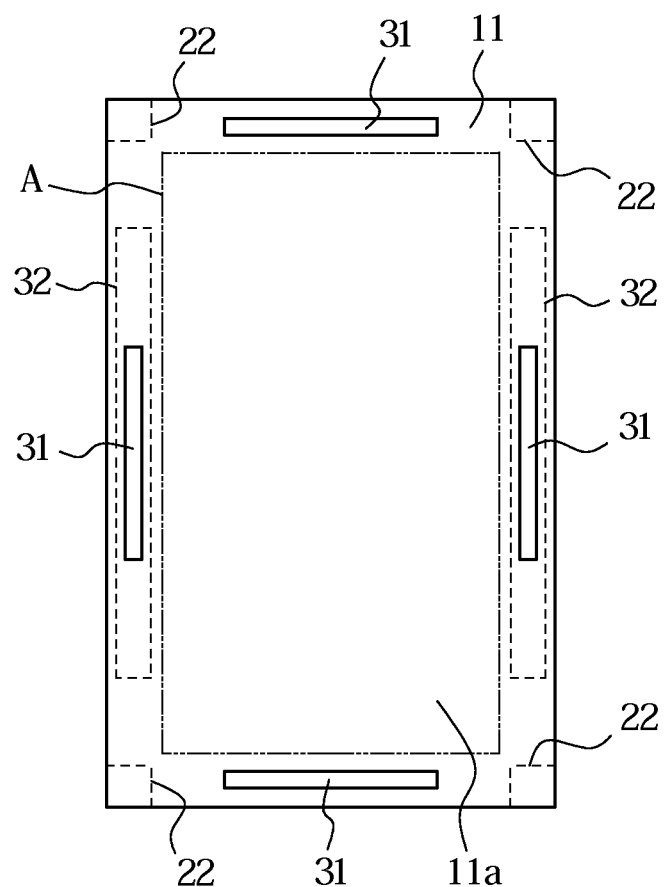
(b)

FIG. 5
(a)
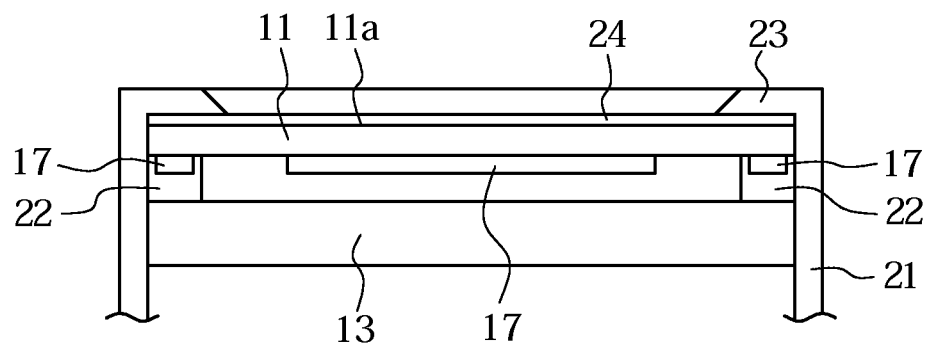
(b)
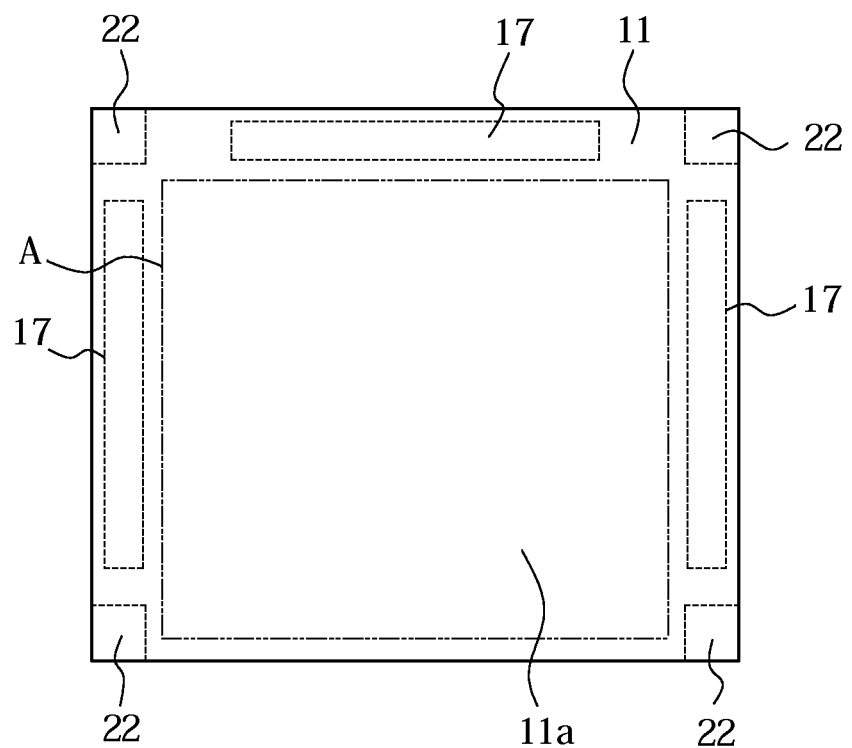

TACTILE SENSATION PROVIDING APPARATUS AND CONTROL METHOD FOR TACTILE SENSATION PROVIDING APPARATUS

CROSS REFERENCE TO RELATED APPLICATIONS

This application claims priority to and the benefit of Japanese Patent Application No. 2009-197437 (filed on Aug. 27, 2009) and Japanese Patent Application No. 2010-149060 (filed on Jun. 30, 2010), the entire contents of which are incorporated herein by reference.

TECHNICAL FIELD

The present invention relates to a tactile sensation providing apparatus having a touch sensor and a control method for a tactile sensation providing apparatuses.

BACKGROUND ART

In recent years, input apparatuses having touch sensors such as touch panels, touch switches or the like are popularly used as input apparatuses such as operation units, switches and the like for receiving input operations by a user in mobile terminals such as mobile phones and gaming machines, information equipments such as calculator, ticket vending machines, home electric appliances such as microwaves, TV sets, lighting equipments, industrial equipments (FA equipments) and the like.

There are known a variety of types of those touch sensors, such as a resistive film type, a capacitive type, an optical type and the like. However, touch sensors of these types receive a touch input by a finger or a stylus pen and, unlike push-button switches, the touch sensors themselves are not physically displaced even when being touched.

Since the touch sensors are not physically displaced when touched, an operator cannot obtain feedback to an input even when the touch input is received. As a result, the operator is likely to input erroneously by touching the same spot multiple times, which may be stressful for the operator.

As methods to prevent such repetitious inputs, there are known methods of visually or auditory confirming the input operations by, for example, generating sounds or by changing a display state, such as colors of input objects such as input buttons and the like graphically depicted on a display unit, according to an input position upon reception of the touch input.

However, such auditory feedback may be difficult to be confirmed in a noisy environment and is not applicable when the equipment being used is in a silent mode. In addition, in using such visual feedback, when the operator is inputting by the finger, if the input object displayed on the display unit is small, the operator may not be able to confirm the change in the display state, as a view of the input object is blocked by a finger.

There is also suggested a feedback method relying on neither the auditory-nor visual sensation but instead generating a tactile sensation at operator's fingertip by vibrating the touch sensor when the touch sensor receives an input (for example, see Patent Documents 1, 2).

As a method to provide a more detailed tactile sensation, in addition, there is known a feedback method to calculate a sliding speed of a user's finger and the like from a contact position on the touch sensor in order to generate a plurality of types of vibrations having vibration times differing among users corresponding to the sliding speeds (for example, see Patent Document 3).

RELATED ART DOCUMENTS

Patent Documents

Patent Document 1: Japanese Patent Laid-Open No. 2003-288158
Patent Document 2: Japanese Patent Laid-Open No. 2008-130055
Patent Document 3: Japanese Patent No. 4046095 Specification

SUMMARY OF INVENTION

Technical Problem

The techniques disclosed in the above Patent Documents 1 and 2, however, merely vibrate the touch sensor when the touch sensor receives an input. Therefore, in using the apparatus having the button switches such as the push-button switches (push-type button switches) are graphically depicted on the touch sensor, and, if the touch sensor has a low threshold to receive an input, a tactile sensation is provided when the finger or the like lightly contacts (touches) the touch sensor. It may trigger erroneous operations in response to an unintentional motion (touch) before the operator pushes, and inflict a feeling of strangeness on the operator upon the unintentional motion (touch). Here, the threshold for the touch sensor to receive a touch input is a threshold at which the touch sensor responds, which is, for a touch sensor of the resistive film type, a threshold of a pressure at which an upper conductive film is contacted to a lower conductive film and, for a touch sensor of the capacitive type, a threshold for detection of an electric signal by contact.

In order to address such a disadvantage, the applicant has developed a tactile sensation providing apparatus which detects a pressure load on a touch face of the touch sensor and, when the detected pressure load reaches a predetermined threshold to provide the tactile sensation, vibrates the touch face of the touch sensor such that the tactile sensation is provided to a pressing object such as the finger and the like.

According to this tactile sensation providing apparatus, since the tactile sensation is provided when the operator pushes the touch face and the pressure load reaches the predetermined threshold, it is possible to allow the operator to perceive reception of an input while reliably preventing erroneous operations triggered by an unintentional touch as described above and the feeling of strangeness.

In addition, the technique disclosed in Patent Document 3 set forth above does not take into account that, even when the pressing object such as the user's finger and the like presses the touch face of the touch sensor applying the same pressure, the pressure load detected by the tactile sensation providing apparatus takes a different value depending on a pushed position. As a result of earnest studies on a change of the pressure from the user and the position on the touch face at which the pressure load is detected by the tactile sensation providing apparatus, the present inventor obtained expertise as follows. FIG. 7 and FIG. 8 are diagrams illustrating examples of distributions of pressure load (voltage) values when the user, applying a certain uniform pressure, presses each position on the touch face of the touch sensor. As illustrated in FIG. 7 and FIG. 8, even when the user, applying the uniform pressure (for example, 1.0 N), presses each position on the touch face, a value detected by the load detection unit (for example, a total of values from four load detection units, in voltage (V) corresponding to a load (N)) is different depending on the pushed position on the touch face. In a case illustrated in FIG. 7, the touch panel is divided into 9 areas 1-9; 3 areas in both a vertical direction and a horizontal direction. The values detected by the load detection unit in an area group A including the areas 1, 3, 7 and 9, an area group B including the areas 2, 4, 6, and 8, and an area group C including the area 5 are 1.0 V, 1.5 V and 2.0 V, respectively. In a case in FIG. 8, the touch panel is divided into 12 areas 1-12 consisting of 4 areas in the vertical direction and 3 areas in the horizontal direction. The values detected by the load detection unit in an area group A including the areas 2, 7 and 9, an area group B including the areas 1, 3, 4, 6 and 10-12, and an area group C including the areas 5 and 8 are 1.0 V, 1.5 V and 2.0 V, respectively. A number of factors including a distance from the load detection unit and a degree of elasticity of a member constituting the touch sensor may be considered as reasons for different pressure load values based on the positions on the touch face. Such difference in detected pressure load values has a great impact on a determination whether the tactile sensation providing apparatus provides the tactile sensation to the user. Here, it is assumed that the tactile sensation providing apparatus determines whether to provide the tactile sensation based on a predetermined standard load (for example, 1.5 V). In this case, when the user inputs to each of the areas in FIG. 7 and in FIG. 8 applying a predetermined pressure (for example, 1 N), the tactile sensation providing apparatus may provide the tactile sensation in response to the input in the area groups B and C but not to the input in the area group A. In other words, in the area A the user needs to input applying pressure (for example, 1.5 N) heavier than the pressure at which the tactile sensation should normally be provided, while in the area C the tactile sensation is provided when the user inputs applying pressure (for example, 0.75 N) lighter than the pressure at which the tactile sensation should normally be provided.

As described above, since the technique disclosed in Patent Document 3 does not take into account that, even when the pressing object such as the user's finger and the like presses the touch face of the touch sensor applying the uniform pressure, the pressure load received by the tactile sensation providing apparatus takes a different value depending on the pushed position. Therefore, when the user inputs to the touch face applying the uniform pressure at which the tactile sensation is to be provided to the user, the value of the pressure load detected by the tactile sensation providing apparatus is different depending on the positions on the touch face. Accordingly, the tactile sensation providing apparatus results in detecting a value failing to satisfy the pressure load for providing the tactile sensation at one position, although the tactile sensation providing apparatus detects a value satisfying the pressure load for providing the tactile sensation at a different position. Therefore, even when the user inputs to the touch face applying the uniform pressure at which the tactile sensation is to be provided, whether the tactile sensation providing apparatus provides the tactile sensation depends on input positions. That is, when the tactile sensation is not provided in spite of that the user inputs applying the uniform pressure at which the tactile sensation is to be provided, the user needs to input applying heavier pressure. In addition, the tactile sensation may be provided at an unintended timing such as when the user inputs applying pressure lower than the pressure at which the tactile sensation is to be provided. Such conditions increase a feeling of strangeness in operation. In order to improve an operation feeling of the user, it is preferable to provide the tactile sensation regardless of the input position of the user when receiving a certain pressure, at which the tactile sensation is to be provided, from the user.

An object of the present invention, in order to meet such a requirement, is to provide the tactile sensation providing apparatus for providing the tactile sensation regardless of the input position of the user when receiving the uniform pressure at which the tactile sensation is to be provided.

Solution to Problem

In order to achieve the above object, a tactile sensation providing apparatus according to a first aspect of the present invention includes:

a load detection unit configured to detect a pressure load when an object presses by a certain pressure a touch face of a touch sensor configured to detect a touch input, wherein the pressure load differs depending on a pushed position of the object on the touch face;

a tactile sensation providing unit configured to provide a tactile sensation to the object pressing the touch face of the touch sensor; and a control unit configured to control according to the pushed position on the touch face such that the tactile sensation providing unit provides the tactile sensation to the object when the object, applying the certain pressure at which the tactile sensation is to be provided, presses any position on the touch face for providing the tactile sensation.

A second aspect of the present invention is the tactile sensation providing apparatus according to the first aspect, wherein the control unit controls according to the pushed position on the touch face based on adjustment information set for each of areas in a size corresponding to its position on the touch face such that the tactile sensation providing unit provides the tactile sensation to the object when the object, applying the certain pressure at which the tactile sensation is to be provided, presses any position on the touch face for providing the tactile sensation.

A third aspect of the present invention is the tactile sensation providing apparatus according to the second aspect, wherein the areas to be set with the adjustment information are divided based on a position of the load detection unit.

A fourth aspect of the present invention is the tactile sensation providing apparatus according to the first aspect, wherein the control unit adjusts the pressure load detected by the load detection unit according to the pushed position and, when the adjusted pressure load satisfies a standard to provide the tactile sensation, controls the tactile sensation providing unit such that the tactile sensation is provided to the object pressing the touch face.

A fifth aspect of the present invention is the tactile sensation providing apparatus according to the first aspect, wherein the control unit adjusts the standard to provide the tactile sensation according to the pushed position and, when the pressure load detected by the load detection unit satisfies the adjusted standard to provide the tactile sensation, controls the tactile sensation providing unit such that the tactile sensation is provided to the object pressing the touch face.

A sixth aspect of the present invention is the tactile sensation providing apparatus according to the first aspect, wherein the control unit, when the pressure load detected by the load detection unit satisfies the standard to provide the tactile sensation adjusted according to the pushed position, controls the tactile sensation providing unit such that the tactile sensation is provided to the object pressing the touch face.

A control method for a tactile sensation providing apparatus according to a seventh aspect of the present invention, the tactile sensation providing apparatus including a load detection unit configured to detect a pressure load when an object presses by a certain pressure a touch face of a touch sensor configured to detect a touch input, wherein the pressure load differs depending on a pushed position of the object on the touch face; and a tactile sensation providing unit configured to provide a tactile sensation to the object pressing the touch face of the touch sensor, includes a step of:

controlling according to the pushed position on the touch face such that the tactile sensation providing unit provides the tactile sensation to the object when the object, applying the certain pressure at which the tactile sensation is to be provided, presses any position on the touch face for providing the tactile sensation.

In order to achieve the above object, a tactile sensation providing apparatus according to an eighth aspect of the present invention includes:

a piezoelectric element configured to detect a pressure load when an object presses by a certain pressure a touch face of a touch sensor configured to detect a touch input, wherein the pressure load differs depending on a pushed position of the object on the touch face, and wherein the piezoelectric element provides a tactile sensation to the object pressing the touch face of the touch sensor; and a control unit configured to control according to the pushed position on the touch face such that the piezoelectric element provides the tactile sensation to the object when the object, applying the certain pressure at which the tactile sensation is to be provided, presses any position on the touch face for providing the tactile sensation.

A ninth aspect of the present invention is the tactile sensation providing apparatus according to the eighth aspect, wherein the control unit controls according to the pushed position on the touch face based on adjustment information set for each of areas in a size corresponding to its position on the touch face such that the piezoelectric element provides the tactile sensation to the object when the object, applying the certain pressure at which the tactile sensation is to be provided, presses any position on the touch face for providing the tactile sensation.

A tenth aspect of the present invention is the tactile sensation providing apparatus according to the ninth aspect, wherein the areas to be set with the adjustment information are divided based on a position of the piezoelectric element.

An eleventh aspect of the present invention is the tactile sensation providing apparatus according to the eighth aspect, wherein the control unit adjusts the pressure load detected by the piezoelectric element according to the pushed position and, when the adjusted pressure load satisfies a standard to provide the tactile sensation, controls the piezoelectric element such that the tactile sensation is provided to the object pressing the touch face.

A twelfth aspect of the present invention is the tactile sensation providing apparatus according to the eighth aspect, wherein the control unit adjusts the standard to provide the tactile sensation according to the pushed position and, when the pressure load detected by the piezoelectric element satisfies the adjusted standard to provide the tactile sensation, controls the piezoelectric element such that the tactile sensation is provided to the object pressing the touch face.

A thirteenth aspect of the present invention is the tactile sensation providing apparatus according to the eighth aspect, wherein the control unit, when the pressure load detected by the piezoelectric element satisfies the standard to provide the tactile sensation adjusted according to the pushed position, controls the piezoelectric element such that the tactile sensation is provided to the object pressing the touch face.

A control method for a tactile sensation providing apparatus according to a fourteenth aspect of the present invention including a piezoelectric element configured to detect a pressure load when an object presses by a certain pressure a touch face of a touch sensor for detecting a touch input, wherein the pressure load differs depending on a pushed position of the object on the touch face, and wherein the piezoelectric element provides a tactile sensation to the object pressing the touch face of the touch sensor, including a step of:

controlling according to the pushed position on the touch face such that the piezoelectric element provides the tactile sensation to the object when the object, applying a certain pressure at which the tactile sensation is to be provided, presses any position on the touch face for providing the tactile sensation.

Effect of the Invention

According to the tactile sensation providing apparatus of the present invention, the tactile sensation is provided regardless of an input position of a user when receiving the certain pressure, at which the tactile sensation is to be provided, from the user.

BRIEF DESCRIPTION OF DRAWINGS

FIG. 2 illustrates diagrams illustrating an exemplary housing structure of a part including a touch sensor illustrated in FIG. 1;

FIG. 5 illustrates diagrams illustrating an exemplary housing structure of a part including the touch sensor illustrated in FIG. 4;

DESCRIPTION OF EMBODIMENTS

Embodiments of the present invention will be described with reference to the accompanying drawings. In the following description, "pressure" represents a user's pressure to press a tactile sensation providing unit, a "pressure load" represents a value of the pressure detected by the tactile sensation providing apparatus, and a "standard load" represents a threshold for determination by the tactile sensation providing apparatus whether to provide a tactile sensation in response to the "pressure load".

First Embodiment

Figure 1:
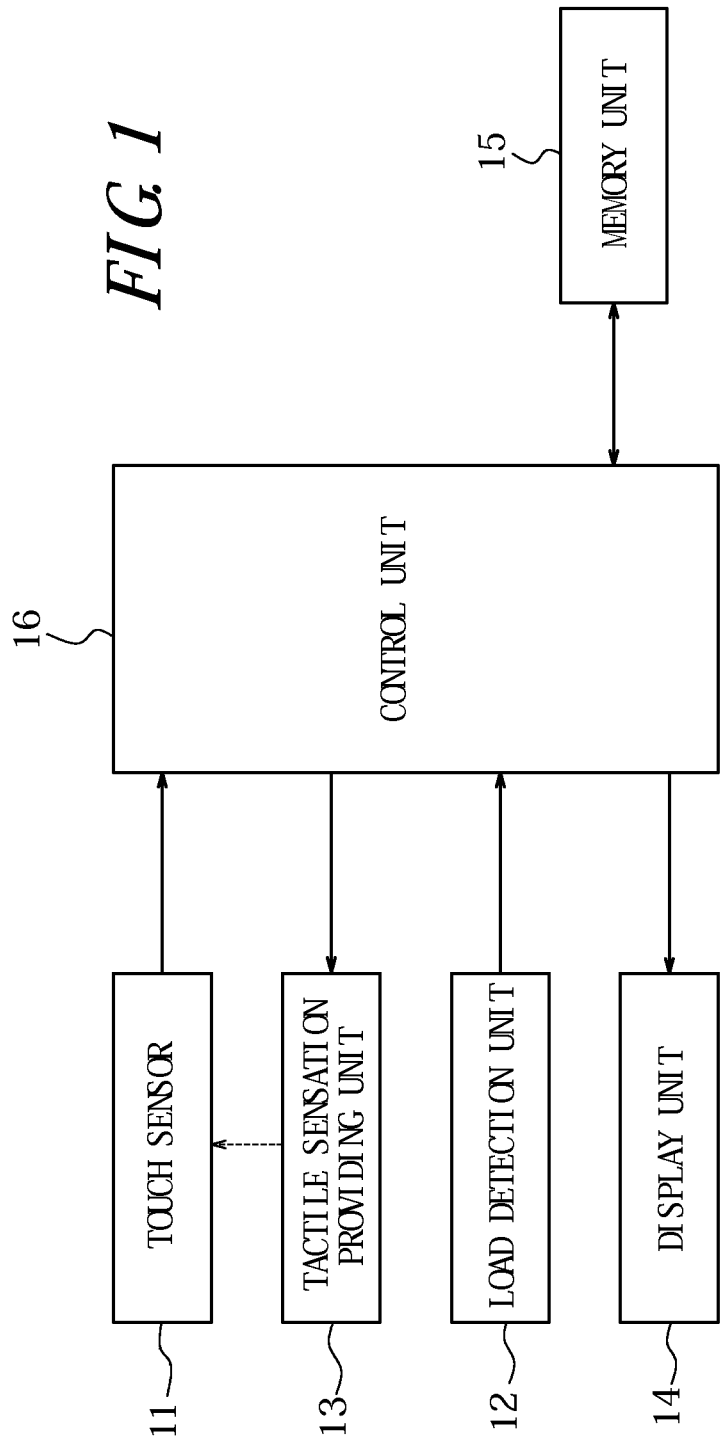
FIG. 1 is a functional block diagram illustrating a tactile sensation providing apparatus according to a first embodiment of the present invention.

FIG. 1 is a functional block diagram illustrating a tactile sensation providing apparatus according to a first embodiment of the present invention. This tactile sensation providing apparatus has a touch sensor 11, a load detection unit 12, a tactile sensation providing unit 13, a display unit 14, a memory unit 15, and a control unit 16 to control overall operations.

The touch sensor 11, disposed on the display unit 14, detects a touch input to a touch face by a touch object such as a finger and the like and may be of a known type, such as a resistive film type, a capacitive type, an optical type and the like to output two-dimensional position information of a touch position (pushed position of a pressing object such as the finger and the like). The load detection unit 12 detects the pressure load by the pressing object such as the finger and the like on the touch face of the touch sensor 11 and is configured by using, for example, a strain gauge sensor, a piezoelectric element or the like, which linearly reacts to the load. The tactile sensation providing unit 13 vibrates the touch sensor 11 and is configured by using, for example, the piezoelectric element.

The display unit 14 displays an input object such as an input button like a push-button switch (push-type button switch) and the like, and is configured by using, for example, a liquid crystal display panel, an organic EL display panel and the like. The touch input to the input object displayed on the display unit 14 is detected by the control unit 16 based on the position information output from the touch sensor 11. The memory unit 15 stores various information such as drive signal information of the tactile sensation providing unit 13 and load adjustment information for adjustment in association with provision of the tactile sensation and is configured by using, for example, a volatile memory or a nonvolatile memory. The control unit 16 may be, for example, a CPU and the like and determines whether to provide the tactile sensation based on the information on the pushed position of the pressing object from the touch sensor 11, information on the pressure load from the load detection unit 12 and the load adjustment information stored in the memory unit 15. In addition, the control unit 15 controls drive of the tactile sensation providing unit 13 based on the drive signal information stored in the memory unit 15 when providing the tactile sensation.

The drive signal information of the tactile sensation providing unit 13 stored in the memory unit 15 includes various information such as a frequency and the number of vibration periods to vibrate the touch face for each tactile sensation to be provided to a user. The control unit 16 controls drive of the tactile sensation providing unit 13 based on the drive signal information stored in the memory unit 15, and provides the pressing object such as the finger and the like with various tactile sensations such as, for example, a "throbbing" sensation, a "vibrating" sensation and a "plock" sensation. Here, when the tactile sensation providing unit 13 is a piezoelectric element, in order to provide soft tactile sensations such as, for example, the "throbbing" sensation and the "vibrating" sensation, the control unit 16 applies a drive signal, a triangle wave or a sine wave with a frequency of approximately 200 Hz to 500 Hz, for two or three periods to the piezoelectric element. In order to provide a hard tactile sensation such as the "plock" sensation, the control unit 16 applies a drive signal, a square wave with a frequency of approximately 200 Hz to 500 Hz, for two or three periods to the piezoelectric element.

In order to enhance an operation sensation of the user, in addition, the control unit 16 can provide a click sensation such as a "ticking" sensation to the pressing object such as the finger and the like by controlling drive of the tactile sensation providing unit 13. In order to provide the click sensation such as the "ticking" sensation obtained when pressing a hard-type push-button switch, the control unit 16 applies the drive signal, a sine wave or a square wave with a frequency of approximately 100 Hz to 200 Hz, for one period. With the click sensation such as the "ticking" sensation, the user can obtain the tactile sensation similar to that obtained when pressing the actual push-button switch even when inputting to the input object graphically depicted on the display unit 14. Thereby, the operation sensation of the user is improved.

The load adjustment information stored in the memory unit 15, for adjustment in association with provision of the tactile sensation according to the pushed position of the pressing object, includes various information such as pressure load adjustment information to adjust the pressure load from the load detection unit 12, standard load adjustment information to adjust the standard load, which is the threshold to provide the tactile sensation, and information on the standard load itself.

(Pressure Load Adjustment Information)

Figure 7:
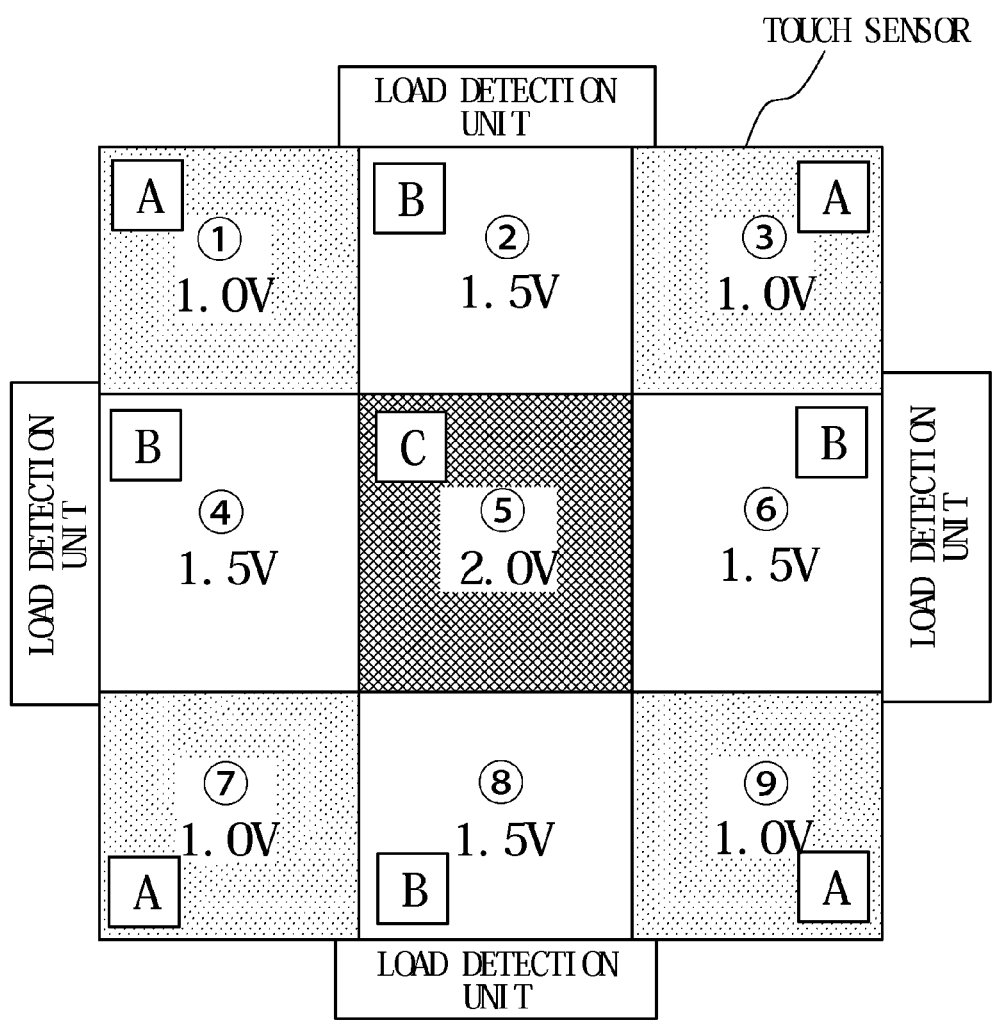
FIG. 7 is a diagram illustrating an example of a distribution of pressure load values corresponding to a pressure from a user.
Figure 8:
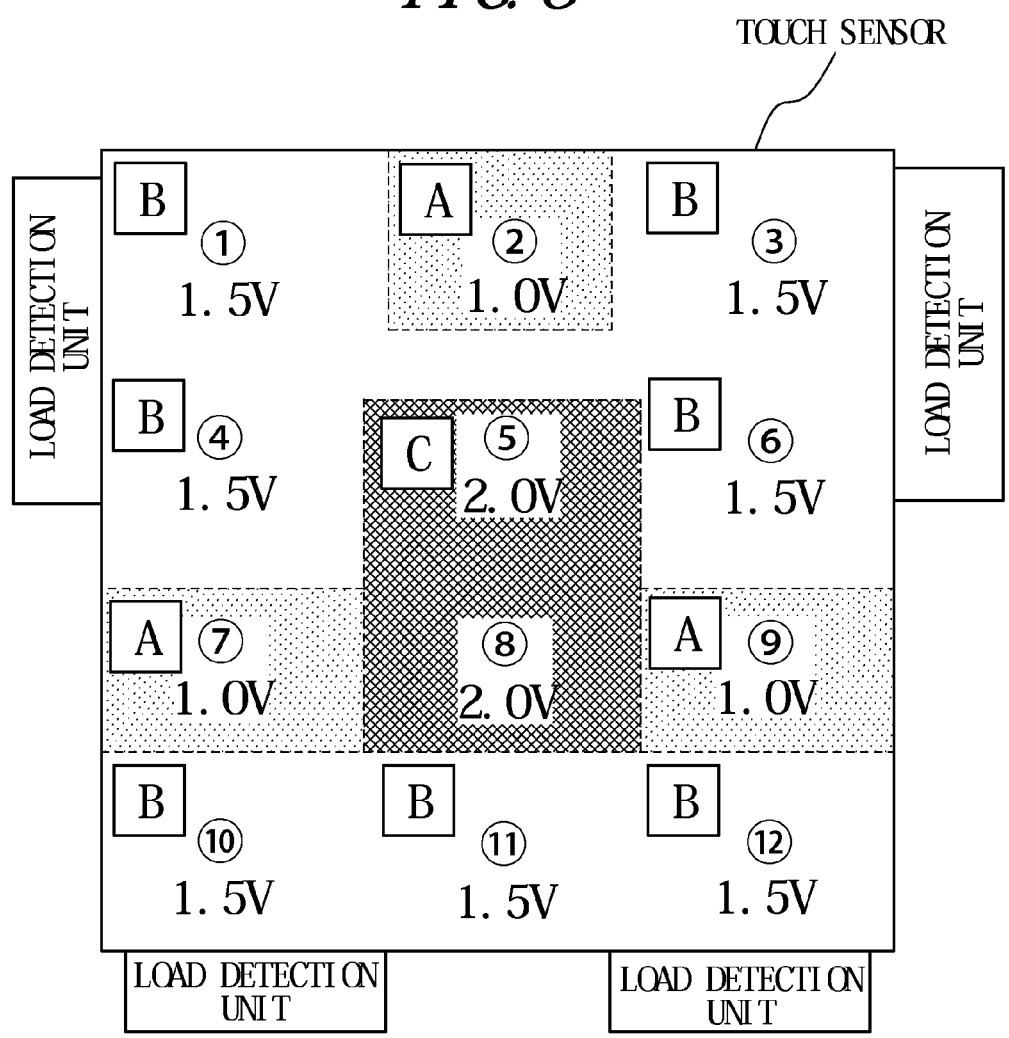
FIG. 8 is a diagram illustrating an example of a distribution of the pressure load values corresponding to the pressure from the user.

For example, FIG. 7 and FIG. 8 are diagrams illustrating examples of pressure load values (voltages) in each area on the touch face detected by the load detection unit for a certain uniform pressure from the user at which the tactile sensation is to be provided. As such, a relationship between positions on the touch face of the touch sensor 11 and the pressure load values detected by the load detection unit 12 is preliminarily measured (calibration measurement) and stored as a table or a list in the memory unit 15 at shipment of products. For example, the touch face of the touch sensor 11 is divided into m'n areas having m areas in a vertical direction and n areas in a lateral direction and a relationship between the pressure from the user in each of the areas and the pressure load values detected is stored in the memory unit 15. In detail, different adjustment values of the pressure load for each of the areas are stored, such as a first value (for example, 1.0 time) as the adjustment value of the pressure load for an input to a first area (for example, an area group B in FIG. 7 and FIG. 8), a second threshold (for example, 0.75 time) as the adjustment value of the pressure load for an input to a second area (for example, an area group C in FIG. 7 and FIG. 8) and a third threshold (for example, 1.5 times) as the adjustment value of the pressure load for an input to a third area (for example, an area group A in FIG. 7 and FIG. 8). By using the pressure load adjustment information as described above, the control unit 16 can adjust the pressure load value detected, according to the pushed position of the pressing object (pressing means). For example, it is assumed that the uniform pressure from the user at which the tactile sensation is to be provided is 1 N and the standard load to provide the tactile sensation is 1.5 N. The control unit 16 compares the pressure load of the input to the first area (for example, the area group B in FIG. 7 and FIG. 8) as it stands (multiplying it by 1.0) with the standard load, compares the pressure load of the input to the second area (for example, the area group B in FIG. 7 and FIG. 8) by multiplying the pressure load by 0.75 with the standard load, and compares the pressure load of the input to the third area (for example, the area group A in FIG. 7 and FIG. 8) by multiplying the pressure load by 1.5 with the standard load. As such, the pressure load is adjusted by using different values for each of the areas. Thereby, when the user applies the uniform pressure (1 N) at which the tactile sensation is to be provided, the pressure load value at each position on the touch face is adjusted to be the same value, which allows the control unit 16 to determine whether to provide the tactile sensation with one common standard load (1.5 V) for each position.

Figure 9:
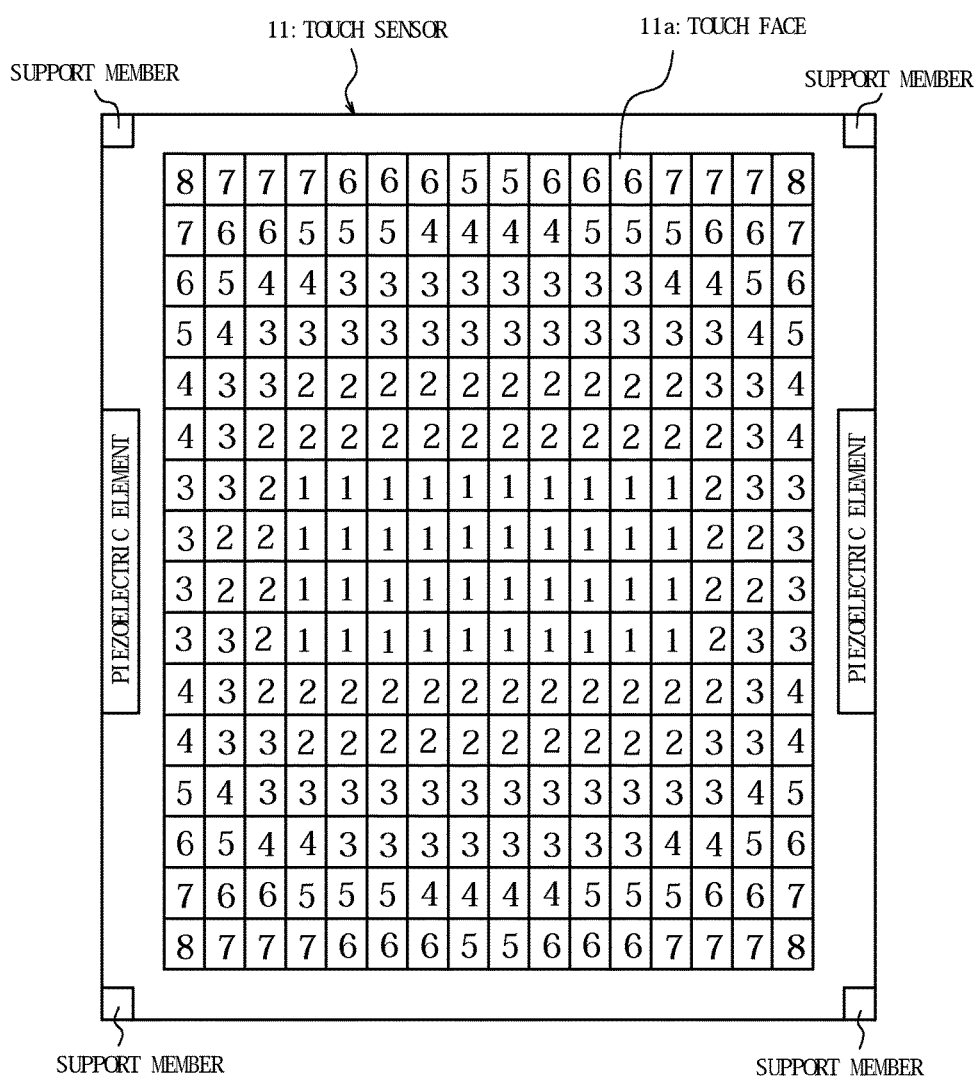
FIG. 9 is a diagram illustrating an example of pressure load adjustment information set for each area on a touch face of the touch sensor.

FIG. 9 is a diagram illustrating an example of the pressure load adjustment information set for each of the areas on the touch face 11a of the touch sensor 11. In this example, the touch sensor 11 is supported by support members made of elastic members at four corners and two piezoelectric elements to detect the load are arranged at centers of two opposing sides of the touch sensor 11. In addition, pressure load adjustment values (1-8) are set as the pressure load adjustment information for each of the areas on the touch face 11a. It is to be noted that the numbers of the adjustment values indicate not absolute values but relative magnitudes among the adjustment values.

In the example in FIG. 9, relatively large adjustment values are set for areas near the support members, whereas relatively small adjustment values are set for areas near the center of the touch face 11a distant from the support members. This is because, when there is an input with the uniform pressure at which the tactile sensation is to be provided, the piezoelectric elements detects a small pressure load value in response to the input to an area near the support members and a large pressure load value in response to an input to the central area of the touch face 11a. In the example illustrated in FIG. 9, in addition, the adjustment values of the areas near the support members finely change, while those of the areas near the center of the touch face 11a distant from the support member change by a small amount. This is because, when there is an input with the uniform pressure at which the tactile sensation is to be provided, the piezoelectric element detects the pressure load values significantly differing among the areas in response to an input to the areas near the support members, whereas the piezoelectric element detects the pressure load values differing among the areas by a small amount in response to an input to the areas near the center of the touch face 11a distant from the support members.

In the example in FIG. 9, in addition, by comparison of the areas near the centers of the sides, for example, relatively small adjustment values are set for the areas near the centers of sides having the piezoelectric elements disposed, whereas relatively large adjustment values are set for the areas near the centers of the sides without the piezoelectric elements. This is because, when there is an input with the uniform pressure at which the tactile sensation is to be provided, the piezoelectric element detects a large pressure load value in response to an input to a peripheral area on the side having the piezoelectric elements disposed, while detecting a small pressure load value in response to an input to the peripheral area on the side without the vibration element. In the example in FIG. 9, further, the adjustment values change by a small amount in the areas near the centers of the sides having the piezoelectric elements disposed, while the adjustment values finely change in the areas near the centers of the sides without the piezoelectric elements. This is because, when there is an input with the uniform pressure at which the tactile sensation is to be provided, the piezoelectric element detects he pressure load values differ by a small amount in the areas near the centers of the sides having the piezoelectric elements disposed thereon, whereas t the piezoelectric element detects the pressure load values significantly differ in the areas near the centers of the sides without the piezoelectric elements.

Figure 10:
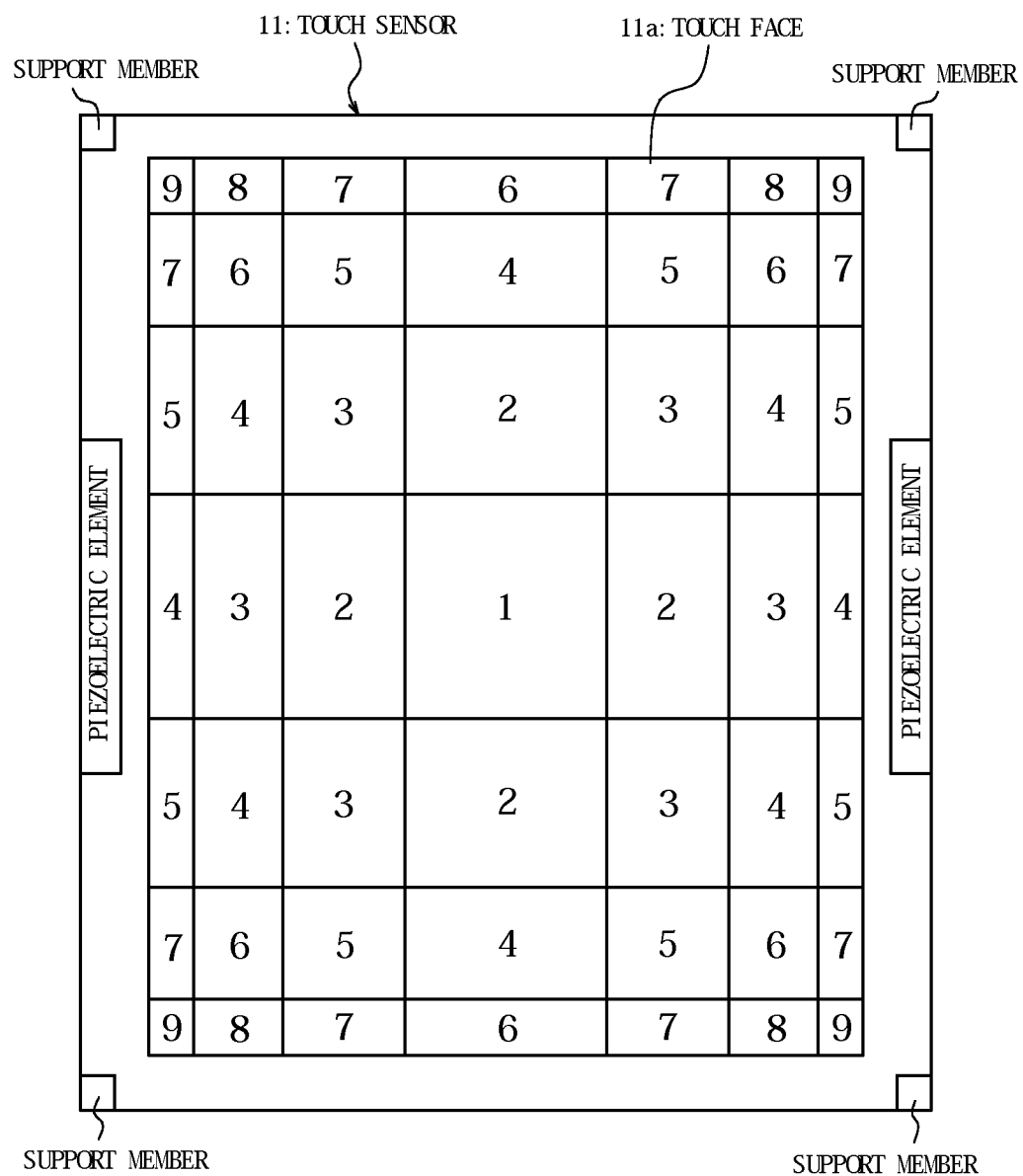
FIG. 10 is a diagram illustrating an example of the pressure load adjustment information set for each area in a size corresponding to its position on the touch face.

Here, the areas to be set with the voltage adjustment values do not have to be in the same size. FIG. 10 is a diagram illustrating an example of the pressure load adjustment information set for each of the areas in sizes corresponding to their positions on the touch face 11a. In FIG. 10, the areas near the support members are in relatively small sizes, whereas the areas near the center of the touch face 11a distant from the support members are in relatively large sizes. This is because, as described with reference to FIG. 9, it is necessary to finely change the adjustment value between the areas near the support members, while it is not necessary to finely change the adjustment value in the areas near the center of the touch face 11a distant from the support members. As described in a comparison of the areas near the center of the sides, relatively small adjustment values are set for the areas near the centers of the sides having the piezoelectric elements disposed thereon, whereas relatively large adjustment values are set for the areas near the centers of the sides without the piezoelectric element. This is because, as described with reference to FIG. 9, when there is an input with the uniform pressure at which the tactile sensation is to be provided, the piezoelectric element detects a large pressure load value in response to an input to the areas on the sides having the piezoelectric elements dispose, while detecting a small pressure load value in response to an input to the areas on the sides without the piezoelectric elements. Setting the pressure load adjustment information for each of the areas in sizes corresponding to their positions on the touch face 11a allows appropriate voltage adjustment even when there are a small number of areas.

Figure 11:
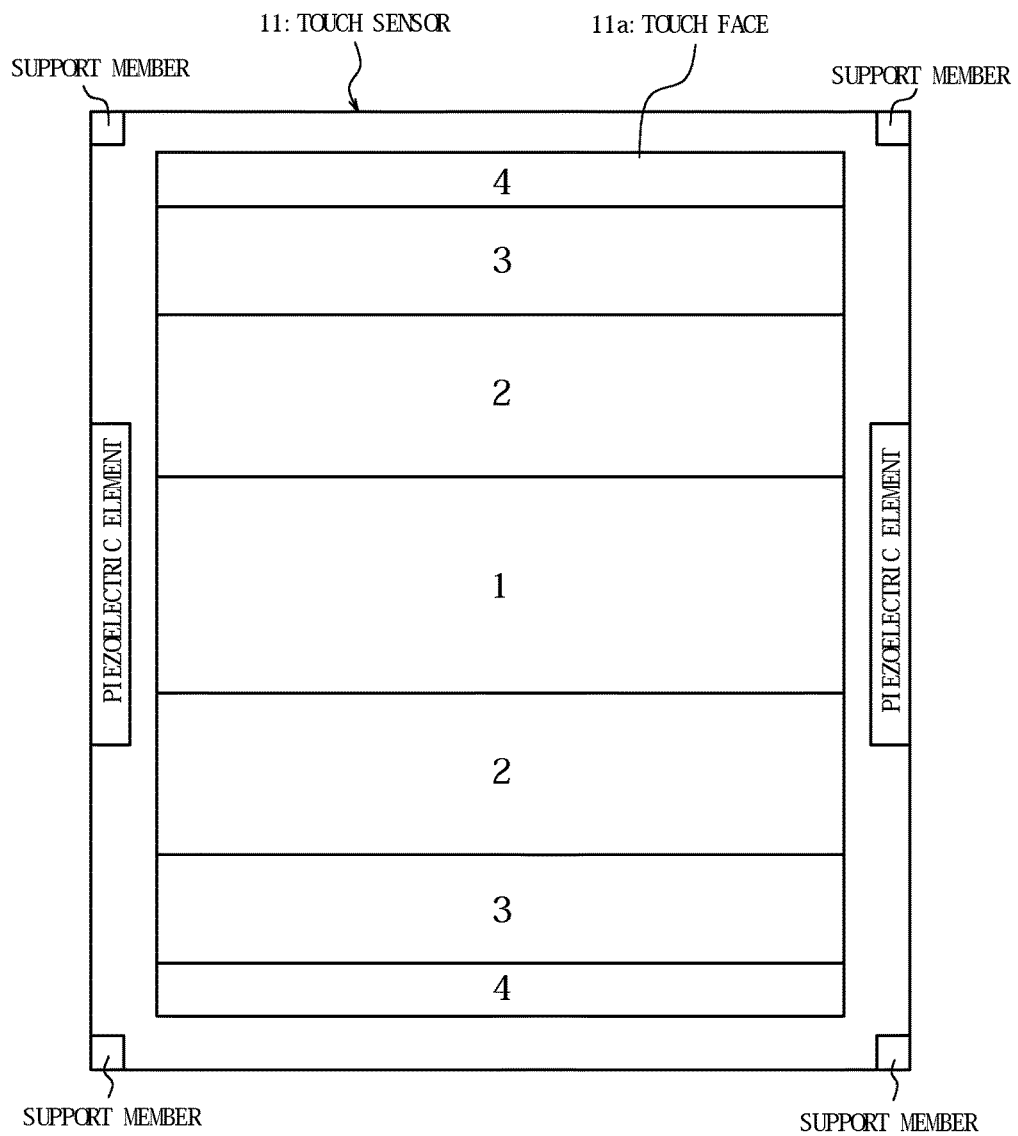
FIG. 11 is a diagram illustrating an example of the pressure load adjustment information set for each area in a size corresponding to its position on the touch face.

FIG. 11 is a diagram illustrating another example of the pressure load adjustment information set for each of the areas in sizes corresponding to their positions on the touch face 11a. In FIG. 11, the touch face 11a is divided into areas into a direction (vertical direction) of the sides having the piezoelectric elements disposed, and those areas are smaller in size as closer to the support members. In FIG. 11, in addition, the touch face 11a is not divided in a direction (lateral direction) of the sides without the piezoelectric elements. As described with reference to FIG. 9, when there is an input with the uniform pressure at which the tactile sensation is to be provided, since the piezoelectric element detects a relatively large pressure load value in response to an input to the area near the piezoelectric elements, the areas distant from the center of the touch face 11a have relatively small attenuation of the vibration amount in the lateral direction. Taking in consideration the positions of the piezoelectric elements, therefore, the touch face 11a is divided into areas in the direction (vertical direction) of the sides having the piezoelectric elements disposed, without being divided into areas in the direction (lateral direction) of the sides without the piezoelectric elements. By setting the pressure load adjustment information for each of the areas divided based on the position of the piezoelectric element and in sizes corresponding to their positions on the touch face 11a, appropriate voltage adjustment is enabled even when there are a small number of areas.

Figure 12:
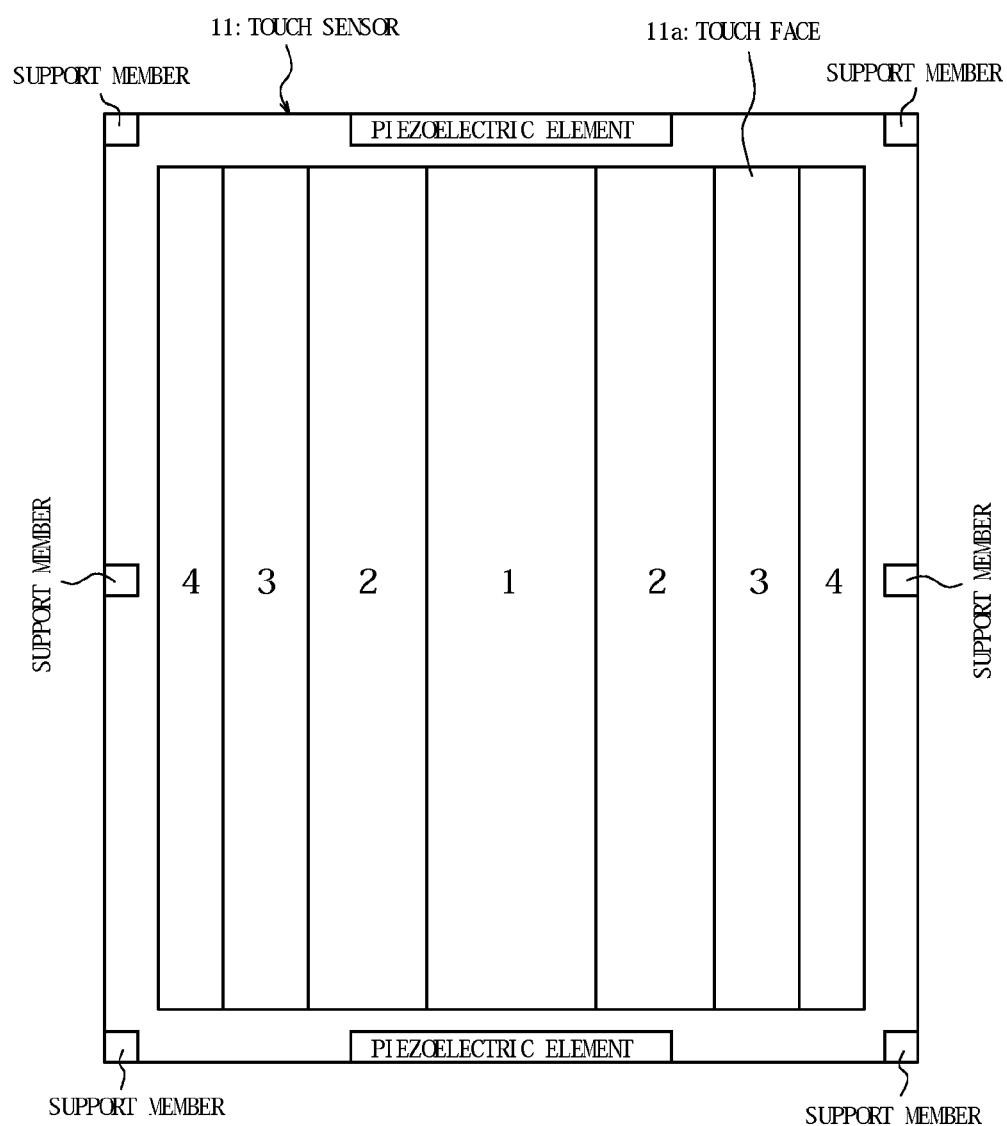
FIG. 12 is a diagram illustrating an example of the pressure load adjustment information set for each area in a size corresponding to its position on the touch face.
Figure 13:
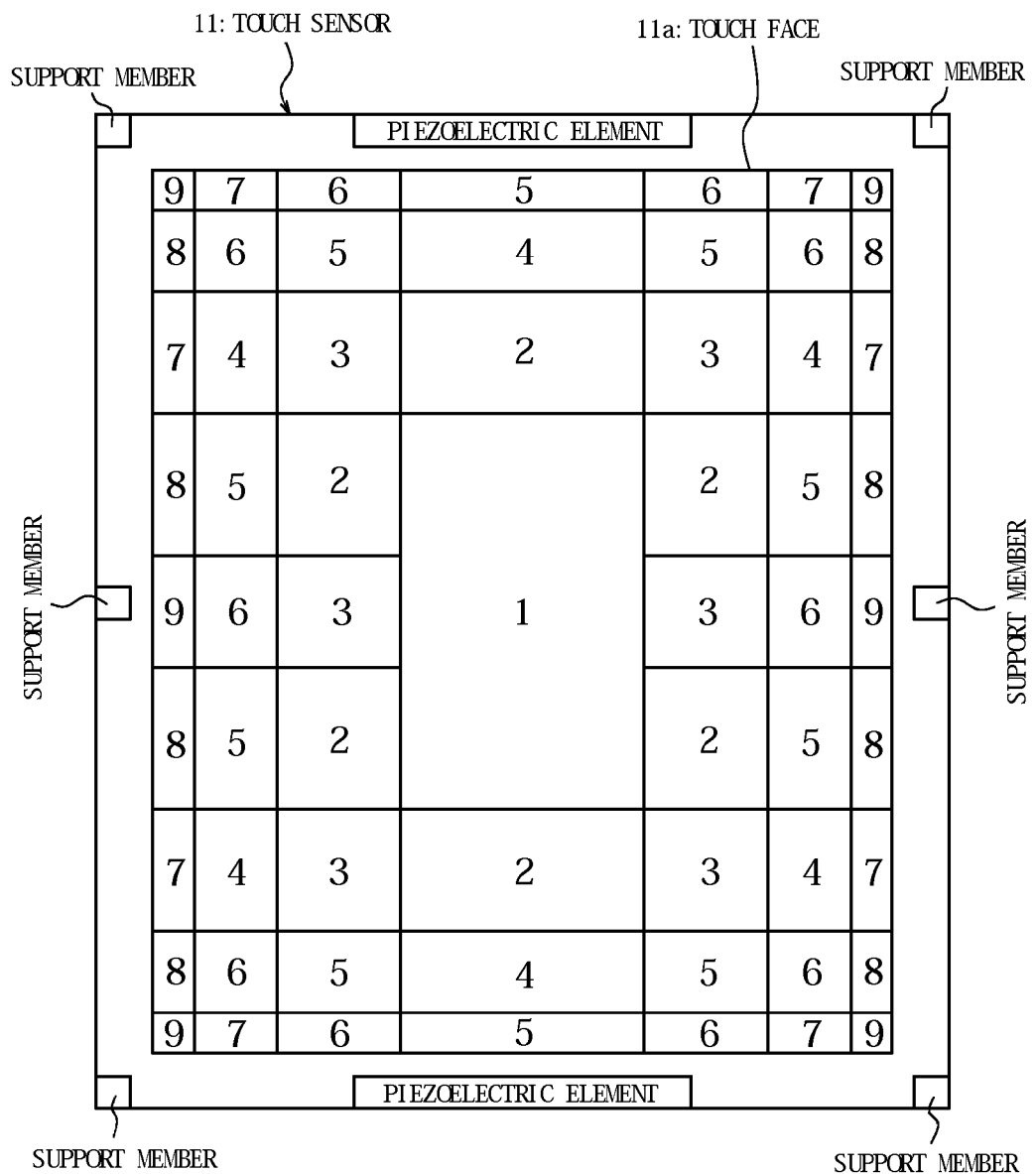
FIG. 13 is a diagram illustrating an example of the pressure load adjustment information set for each area in a size corresponding to its position on the touch face.

FIG. 12 is a diagram illustrating an example of the pressure load adjustment information set for each of the areas. In FIG. 12, the touch sensor 11 is supported by six support members in total made of the elastic members, which are disposed at each of four corners, a center of a left periphery and a center of a right periphery. Two piezoelectric elements are disposed on the center of each opposing periphery of the touch sensor 1. In FIG. 12, in similar manner to FIG. 11, the touch face 11a is divided into areas in the direction (lateral direction) of the sides having the piezoelectric elements disposed and the areas are smaller as closer to the support members. In addition, FIG. 13 is a diagram illustrating another example of the pressure load adjustment information set for each of the areas. In FIG. 13, the touch face 11a is divided into relatively small areas near the six support members, while the touch face 11a is divided into relatively large areas near the center of the touch face 11a distant from the support members. The areas to be set with the adjustment values do not need to be divided in a matrix form. For example, in the central area of the touch face 11a having an adjustment value 1 set thereto, defining the areas to be set with the adjustment values in a variety of manners allows more appropriate voltage adjustment.

(Standard Load Adjustment Information)

The memory unit 15 can store the adjustment values of the standard load, as a standard to provide the tactile sensation, for each position on the touch face. For example, the memory unit 15 can store the adjustment values of the standard load different for each area, such as a first value (for example, 1.0 time) as the adjustment value of the standard load for an input to a first area (for example, an area group B in FIG. 7 and FIG. 8), a second threshold (for example, 1.33 (=4/3) times) as the adjustment value of the standard load for an input to a second area (an area group C in FIG. 7 and FIG. 8), and a third threshold (for example, 0.66 (=2/3) times) as the adjustment value of the standard load for an input to a third area (for example, an area group A in FIG. 7 and FIG. 8). Thereby, the standard load is adjusted according to an input position on the touch face when the user applies the uniform pressure (1 N) at which the tactile sensation is to be provided, the control unit 16 can determine whether to provide the tactile sensation by comparing the adjusted standard load and the pressure load.

In the similar manner to the adjustment values of the pressure loads in FIG. 10 to FIG. 13, the areas to be set with the standard load adjustment information do not need to be in the same size. For example, the sizes of these areas to be set with the standard load adjustment information may be determined based on their positions on the touch face. Also, the areas to be set with the standard load adjustment information can be divided based on a position of the piezoelectric element.

(Standard Load)

The memory unit 15 can also store the standard load, as a standard to provide the tactile sensation, adjusted based on the position on the touch face. For example, the memory unit 15 can store the standard load different between the areas such as, for example, a first threshold (for example, 1.0 V) as a standard load for an input to the first area (for example, the area group A in FIG. 7 and FIG. 8), a second threshold (for example, 1.5 V) for an input to the second area (for example, the area group B in FIG. 7 and FIG. 8) and a third threshold (for example, 2.0 V) for an input to the third area (for example, the area group C in FIG. 7 and FIG. 8). Thereby, when the user applies the uniform pressure (1 N) at which the tactile sensation is to be provided, the control unit 16 can retrieve the standard load corresponding to the input position on the touch face and determine whether to provide the tactile sensation by comparing the retrieved standard load and the pressure load.

In the similar manner to the adjustment values of the pressure loads illustrated in FIG. 10 to FIG. 13, the areas to be set with the adjusted standard loads do not need to be in the same size. For example, the sizes of these areas to set the adjusted standard load may be determined based on their positions on the touch face. It is also possible to have the divided areas to be set with the adjusted standard load based on the position of the piezoelectric element.

The load adjustment information stored in the memory unit 15 for adjustment of the load to provide the tactile sensation according to the pushed position of the pressing object is not limited to the information to adjust the pressure load, the information to adjust the standard load and the information on the standard load itself but may take any parameters associated with determination whether to provide the tactile sensation.

FIG. 2 illustrates an exemplary housing structure of a part including the touch sensor 11 illustrated in FIG. 1; FIG. 2(a) is a cross-sectional view of a main section, and FIG. 2(b) is a plane view of the main section. The display panel 14 is contained and held in a housing 21. The touch sensor 11 is disposed on the display unit 14 via insulators 22 made of elastic members. According to the present embodiment, the touch sensor 11 and the display unit 14 are rectangular in shape in a planer view and the touch sensor 11 is disposed on the display unit 14 via the insulators 22, which are arranged at the four corners outside a display area A of the display unit 14 illustrated by a chain double-dashed line in FIG. 2(b).

In addition, the housing 21 is provided with an upper cover 23 covering a surface area of the touch sensor 11 outside the display area of the display panel 14. Insulators 24 made of elastic members are arranged between the upper cover 23 and the touch sensor 11.

The touch sensor 11 illustrated in FIG. 2 may have, for example, a surface member having the touch face 11a and constituted by a transparent film or the glass, and a rear face member constituted by the glass or acryl. The touch sensor 11 is designed such that, when the touch face 11a is pressed down, the pushed position or an entire structure is bent (strained) slightly in accordance with a pressure force.

A load sensor 31 having the strain gauge sensor or the piezoelectric element to detect a load (pressuring force) applied on the touch sensor 11 is provided, adhered or the like, on the surface of the touch sensor 11 at a position close to each side covered by the upper cover 23. In addition, the piezoelectric element 32 to vibrate the touch sensor 11 is provided, adhered or the like, on the rear face of the touch sensor 11 close to each of two opposed sides. That is, the tactile sensation providing apparatus illustrated in FIG. 2 has the load detection unit 12 illustrated in FIG. 1 configured by using four strain gauge sensors 31 and the tactile sensation providing unit 13 configured by using two piezoelectric elements 32. The tactile sensation providing unit 13 vibrates the touch sensor 11 to vibrate the touch face 11a such that the tactile sensation is provided to the touch object on the touch face 11a. It is to be noted that the housing 21, the upper cover 23 and the insulator 24 illustrated in FIG. 2(a) are omitted in FIG. 2(b).

According to the tactile sensation providing apparatus of the present embodiment, the touch sensor 11 detects a touch operation to the touch face 11a. Then, the control unit 16 adjusts the pressure load according to the pushed position of the pressing object and determines whether the pressure load detected by the load detection unit 12 satisfies the standard load to provide the tactile sensation. When determining that the pressure load satisfies the standard to provide the tactile sensation, the control unit 16 controls drive of the tactile sensation providing unit 13 such that the tactile sensation is provided to the pressing object pressing the touch face 11a.

Figure 3:
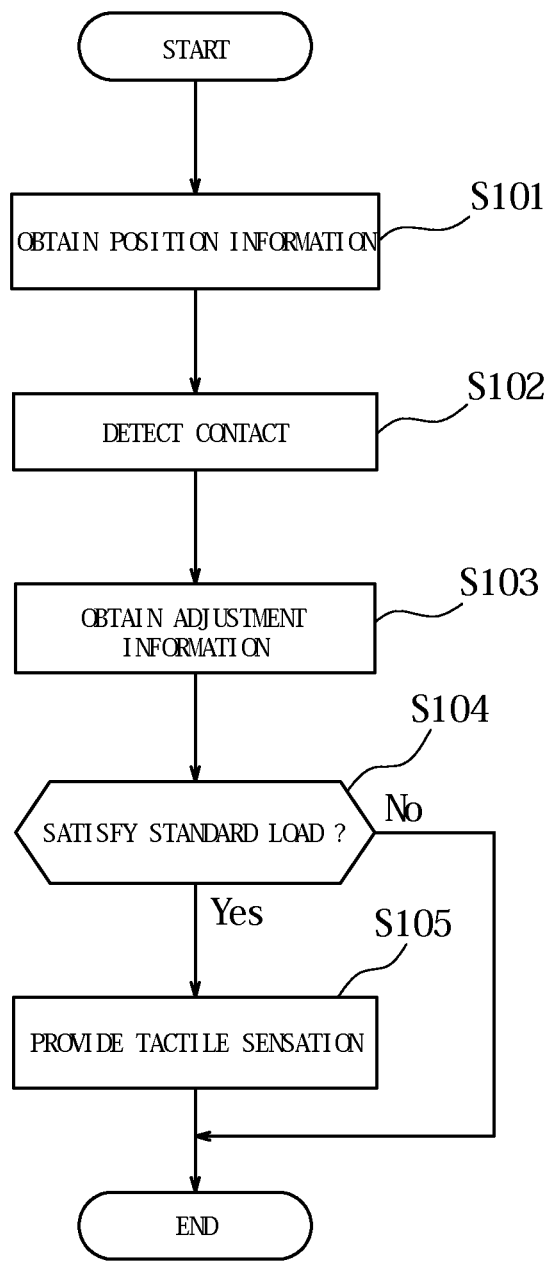
FIG. 3 is a flow chart illustrating an operation to provide a tactile sensation by the tactile sensation providing apparatus according to the first embodiment.

The following is a description of an operation to provide the tactile sensation as notification information by the tactile sensation providing apparatus according to the present embodiment, with reference to a flowchart illustrated in FIG. 3.

First, the control unit 16 detects an input of the position information (pushed position of the pressing object) from the touch sensor 11 (step S101) and detects contact to the touch face 11a by the pressing object such as the finger and the like (step S102). Next, the control unit 16 retrieves the load adjustment information corresponding to the pushed position of the pressing object from the memory unit 15 (step S103) and determines whether the pressure load input from the load detection unit 12 satisfies the standard load to provide the tactile sensation (step S104). For example, the control unit 16 can adjust the pressure load corresponding to the pressing position of the pressing object by using the pressure load adjustment information from the load detection unit 12 for adjustment of the pressure load and determine whether the adjusted pressure load satisfies the standard load to provide the tactile sensation. The control unit 16 can also adjust the standard load according to the pushed position of the pressing object by using the standard load adjustment information to adjust the standard load as a threshold to provide the tactile sensation and determine whether the pressure load input from the load detection unit 12 satisfies the adjusted standard load. Further, the control unit 16 can retrieve, from the memory unit 15, the adjustment information of the standard load, which is the threshold to provide the tactile sensation and adjusted according to the pushed position, and determine whether the pressure load input from the load detection unit 12 satisfies the standard load retrieved. As a result of step S104, if determining that the pressure load satisfies the standard load (in case of Yes), the control unit 16, refereeing to the memory unit 15, retrieves the drive signal information to provide the tactile sensation, and drives the tactile sensation providing unit 13 with the drive signal such that the tactile sensation is provided to the user (step S105). The control unit 16 can control drive of the tactile sensation providing unit 13 such that a click sensation is provided as the tactile sensation.

According to the tactile sensation providing apparatus of the present embodiment, the control unit 16 adjusts the pressure load detected by the load detection unit 12 and the standard load to provide the tactile sensation according to the pushed position of the pressing object such as the user's finger or the like and, when the user applies the uniform pressure at which the tactile sensation is to be provided, controls such that the pressure load satisfies the standard load. Accordingly, when receiving the uniform pressure from the user at which the tactile sensation is to be provided, the tactile sensation can be provided regardless of the pushed position of the user on the touch face. Thus an operation sensation of the user is improved. In other words, it is not necessary for the user to apply pressure heavier than that at which the tactile sensation is to be provided, in order to receive the tactile sensation from the tactile sensation providing apparatus. In addition, the tactile sensation is not erroneously provided in response to an input with pressure lighter than that at which the tactile sensation is to be provided. Thereby, inflicting a feeling of strangeness on the user in operation can be prevented.

In addition, by adjusting the pressure load detected by the load detection unit 12 according to the pushed position of the pressing object, the control unit 16 can provide the tactile sensation regardless of the pushed position on the touch face by the user when the user applies the uniform pressure at which the tactile sensation is to be provided. Thereby, the operation sensation of the user is improved.

Moreover, by adjusting the standard load to provide the tactile sensation according to the pushed position of the pressing object, the control unit 16 can provide the tactile sensation regardless of the pushed position on the touch face by the user when the user applies the uniform pressure at which the tactile sensation is to be provided. Thereby, the operation sensation of the user is improved.

Further, by retrieving and using the standard load adjusted according to the pushed position of the pressing object, the control unit 16 can provide the tactile sensation regardless of the pushed position on the touch face by the user when the user applies the uniform pressure at which the tactile sensation is to be provided. Thereby, the operation sensation of the user is improved.

Second Embodiment

Figure 4:
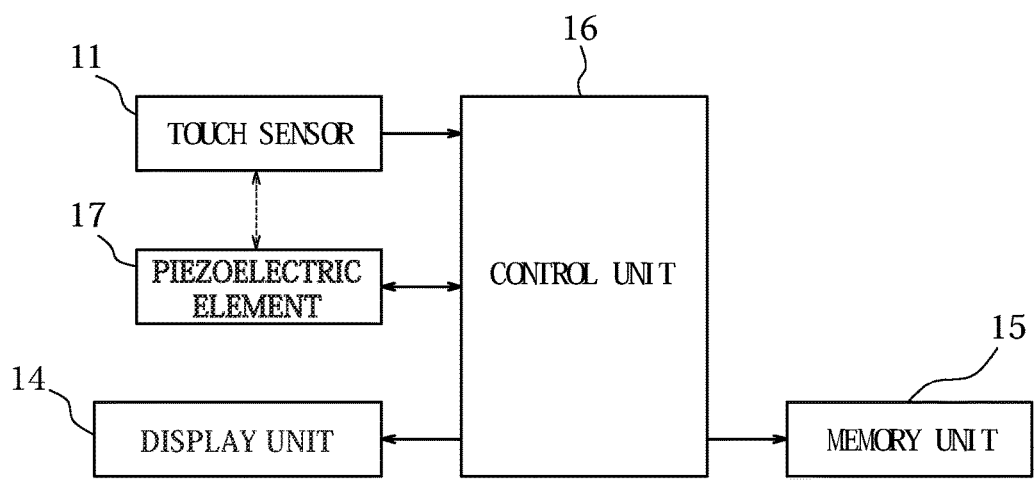
FIG. 4 is a functional block diagram illustrating a tactile sensation providing apparatus according to a second embodiment of the present invention.

FIG. 4 is a functional block diagram illustrating a schematic configuration of a tactile sensation providing apparatus according to a second embodiment of the present invention. This tactile sensation providing apparatus has a configuration according to the first embodiment illustrated in FIG. 1, except for having the piezoelectric element 17 in place of the load detection unit 12 and the tactile sensation providing unit 13. The touch sensor 11, the display unit 14, the memory unit 15 and the control unit 16 have the same functions as those of the first embodiment, and thus detailed descriptions thereof are omitted. According to the present embodiment, the "load detection unit 12" and the "tactile sensation providing unit 13" in the descriptions of the touch sensor 11, the display unit 14, the memory unit 15 and the control unit 16 in the first embodiment are appropriately substituted for the "piezoelectric element 17".

The piezoelectric element 17 is mounted on the touch sensor 11. The control unit 16 controls the piezoelectric element 17 to operate in one of a load detection mode to detect the pressure load on the touch face 11a of the touch sensor 11 by utilizing direct piezoelectric effect and a tactile sensation providing mode to vibrate the touch face 11a of the touch sensor 11 by utilizing converse piezoelectric effect. In the load detection mode, an output signal corresponding to the pressure load on the touch face 11a of the touch sensor 11 is provided to the control unit 16. In the tactile sensation providing mode, the touch face 11a of the touch sensor 11 is vibrated based on the drive signal supplied from the control unit 16 such that a predetermined tactile sensation corresponding to the drive signal is provided to the pressing object pressing the touch face.

FIG. 5 illustrates an exemplary housing structure of the touch sensor 11, the piezoelectric element 17 and the display unit 14 illustrated in FIG. 4; FIG. 5(a) is a cross-sectional view of a main section, and FIG. 5(b) is a plane view of the main section. The piezoelectric element 17 is provided on the rear face of the touch sensor 11 at a position covered by the upper cover 23 and close to one or a plurality of sides (here, for example, three sides), in order to detect the pressure load on the touch face 11a of the touch sensor 11 and also to vibrate the touch sensor 11 such that the tactile sensation is provided to the pressing object pressing the touch face 11a. The three piezoelectric elements 17 supply the outputs to the control unit 16 in parallel. It is to be noted that the housing 21, the upper cover 23 and the insulator 24 illustrated in FIG. 5(a) are omitted in FIG. 5(b).

According to the tactile sensation providing apparatus of the present embodiment, the touch sensor 11 detects the touch operation to the touch face 11a. Then, the control unit 16 adjusts the load according to the pushed position of the pressing object and determines whether the pressure load detected by the piezoelectric element 17 satisfies the standard load to provide the tactile sensation. When determining that the pressure load satisfies the standard load to provide the tactile sensation, the control unit 16 controls drive of the piezoelectric element 17 such that the tactile sensation is provided to the pressing object pressing the touch face 11a.

Figure 6:
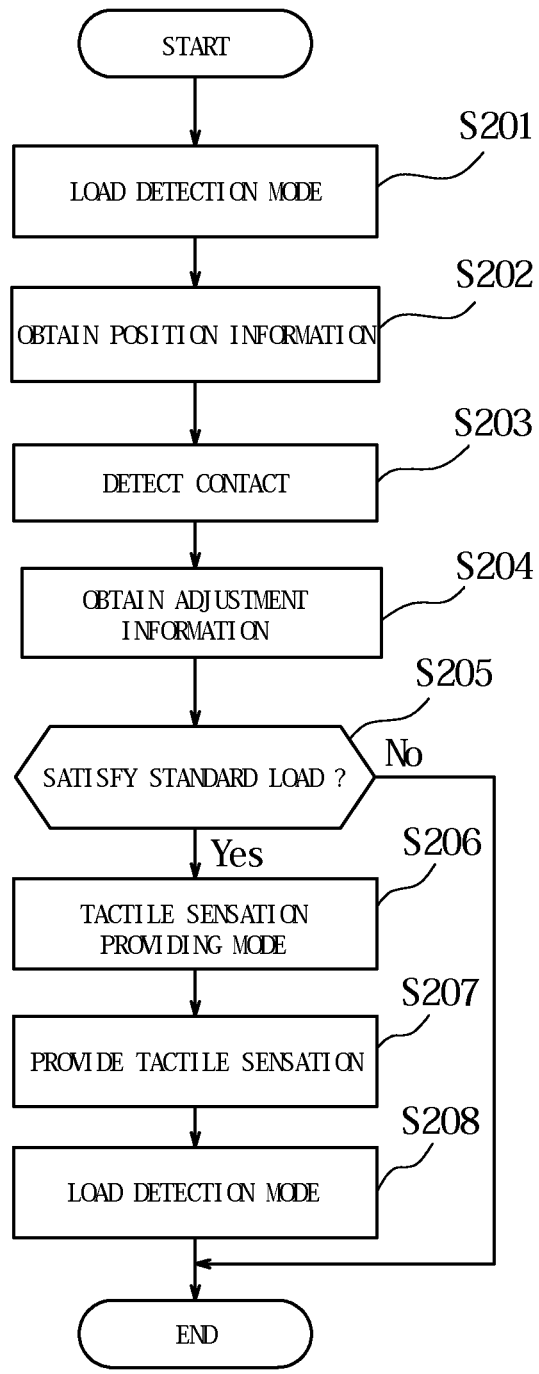
FIG. 6 is a flow chart illustrating an operation to provide the tactile sensation by the tactile sensation providing apparatus according to the second embodiment.

The following is a description of an operation to provide the tactile sensation as the notification information by the tactile sensation providing apparatus according to the present embodiment, with reference to a flowchart illustrated in FIG. 6.

First, the control unit 16 sets the three piezoelectric elements 17 in the load detection mode and monitors outputs from them (step S201). Next, the control unit 16, by detecting an input of the position information (pushed position of the pressing object) from the touch sensor 11 (step S202), detects contact to the touch face 11a by the pressing object such as the finger and the like (step S203). Then, the control unit 16 retrieves the adjustment information corresponding to the pushed position of the pressing object from the memory unit 15 (step S204) and determines whether the pressure load input from the piezoelectric element 17 satisfies the standard load to provide the tactile sensation (step S205). For example, the control unit 16 can adjust the pressure load according to the pushed position of the pressing object by using the pressure load adjustment information for adjustment of the pressure load from the piezoelectric element 17 and determine whether the adjusted pressure load satisfies the standard load to provide the tactile sensation. The control unit 16 can also adjust the standard load according to the pushed position of the pressing object by using the standard load adjustment information for adjustment of the standard load as the threshold to provide the tactile sensation and determine whether the pressure load input from the piezoelectric element 17 satisfies the adjusted standard load to provide the tactile sensation. Further, the control unit 16 can retrieve the adjustment information of the standard load, which is the threshold to provide the tactile sensation and adjusted according to the pushed position, from the memory unit 15 according to the pushed position of the pressing object and determine whether the pressure load input from the piezoelectric element 17 satisfies the standard load retrieved. As a result of step S205, when determining that the pressure load satisfies the standard load (in case of Yes), the control unit 16 switches the mode of the piezoelectric elements 17 from the load detection mode to the tactile sensation providing mode (step S206). Subsequently, the control unit 16 retrieves the drive signal information to provide the tactile sensation from the memory unit 15 and drives the tactile sensation providing unit 13 with the drive signal such that the tactile sensation is provided to the user (step S207). The control unit 16 can control drive of the tactile sensation providing unit 13 such that the click sensation is provided as the tactile sensation. Then, the control unit 16 returns the mode of the three piezoelectric elements 17 to the load detection mode (step S208).

According to the tactile sensation providing apparatus of the present embodiment, since the piezoelectric element 17 serves dual function as a load sensor to detect the pressure load on the touch face 11a of the touch sensor 11 and an actuator to vibrate the touch face 11a, it enables reduction in the number of components and cost. In addition, reduction in the number of components allows to save space for the components, thereby enabling downsizing of the apparatus.

According to the tactile sensation providing apparatus of the present embodiment, in addition, the control unit 16 adjusts the pressure load detected by the piezoelectric element 17 and the standard load to provide the tactile sensation according to the pushed position of the pressing object such as the user's finger or the like and, when the user applies the uniform pressure at which the tactile sensation is to be provided, controls the pressure load to satisfy the standard to provide the tactile sensation. Accordingly, when receiving the uniform pressure from the user at which the tactile sensation is to be provided, the tactile sensation is provided regardless of the pushed position of the user on the touch face. Thus the operation sensation of the user is improved. In other words, it is not necessary for the user to input applying pressure higher than the pressure at which the tactile sensation is to be provided, in order to receive the tactile sensation from the tactile sensation providing apparatus. In addition, the tactile sensation is not erroneously provided in response to an input with pressure lighter than that at which the tactile sensation is to be provided. Thereby, inflicting the feeling of strangeness on the user in operation is prevented.

In addition, by adjusting the pressure load detected by the piezoelectric element 17 according to the pushed position of the pressing object, the control unit 16 can provide the tactile sensation regardless of the pushed position of the user on the touch face when receiving the uniform pressure at which the tactile sensation is to be provided. Thereby, it is possible to improve the operation sensation of the user.

Moreover, by adjusting the standard load to provide the tactile sensation according to the pushed position of the pressing object, the control unit 16 can provide the tactile sensation regardless of the pushed position of the user on the touch face when receiving the uniform pressure at which the tactile sensation is to be provided. Thereby, it is possible to improve the operation sensation of the user.

Further, by retrieving and using the standard load adjusted according to the pushed position of the pressing object, the control unit 16 can provide the tactile sensation regardless of the pushed position of the user on the touch face when receiving the uniform pressure at which the tactile sensation is to be provided. Thereby, it is possible to improve the operation sensation of the user.

Although the present invention is described based on the figures and the embodiments, it is to be understood that various modifications and changes may be implemented by those who are ordinarily skilled in the art. Accordingly, such modifications and changes are included in a scope of the present invention. For example, a function and the like included in each element is rearranged by combining a plurality of elements or dividing the element without logical inconsistency.

For example, it is configured that a tactile sensation is stimulated until the load on the touch sensor 11 calculated based on the output of the load detection unit 12 or the piezoelectric element 17 satisfies the standard (for example, 1 N) to provide the tactile sensation and, when the load satisfies the standard, the tactile sensation providing unit 13 or the piezoelectric element 17 is driven with the predetermined drive signal to vibrate the touch face 11a, such that the tactile sensation is stimulated. Thereby, the click sensation is provided to the operator such that the operator recognizes that an input operation is completed. Accordingly, even by the button switch such as the push-button switch (push-type button switch) which is graphically depicted on the touch sensor 11, the operator can carry out the input operation to the touch sensor 11 feeling the realistic click sensation similar to that obtained when operating the push-button switch. Thus, the operator may not have the feeling of strangeness. Moreover, since the operator can carry out the input operation in conjunction with perception to "have pressed" the touch sensor 11, erroneous inputs caused by mere pressing are prevented.

The standard of the pressure load to provide the tactile sensation may be appropriately set in accordance with a load characteristic of an intended push-button switch in pressing. For example, the standard may be set to be equal to a load at which the touch sensor 11 responds to the touch input (synchronizing a timing to provide the tactile sensation with a timing of response to the touch input by the touch sensor 11) or to be higher than the load at which the touch sensor 11 responds to the touch input (setting the timing to provide the tactile sensation later than the timing of response to the touch input by the touch sensor 11). For example, when the tactile sensation providing apparatus according to the present embodiment is applied to a mobile terminal, it is preferable to set the standard equal to or higher than the load at which the touch sensor 11 responds to the touch input (setting the timing to provide the tactile sensation later than the timing of response to the touch input by the touch sensor 11). Or, the users can set the standard as desired such that an elder user may set it heavier (slower) and a young user may set it lighter (quicker).

In addition, for example, the number of tactile sensation providing units 13, load detection units 12 and piezoelectric elements 17 is not limited to their numbers set forth in the embodiments set forth above but may take any number. For example, the number of piezoelectric elements 17 is not limited to three but may take any number. Further, the piezoelectric element 17 may have a known configuration such as monomorph, unimorph, bimorph and a laminated type, based on a size, vibration amplitude and the like of the touch sensor 11.

The present invention is effectively applicable to a tactile sensation providing apparatus in which the touch sensor 11 serves as a touch switch for on/off operations. Also, the tactile sensation providing apparatus according to the present invention is capable of providing feelings of a multistep switch, such as a two-step switch (pressed further after pressed), by sequentially providing the tactile sensation on different standards (loads) while the touch sensor 11 is being pressed. Thereby, if the input apparatus is applied to a release button of a camera, for example, a feeling of lock focus (first step) and a feeling of release (second step) are provided. In addition, in combination with the display unit 14, the input apparatus can change a display of a menu level screen and the like in a variety of manners in accordance with the steps of pressing. Moreover, when providing the feelings of the multistep switch as described above, to change the drive signal to vibrate the touch face can be changed at each step in order to provide a different tactile sensation at each step.

According to the present invention, the tactile sensation providing apparatus drives the tactile sensation providing unit 13 or the piezoelectric unit 17 when the pressure load detected based on the output of the load detection unit 12 or the piezoelectric element 17 satisfies the standard to provide the tactile sensation. Here, "when the pressure load detected based on the output of the load detection unit 12 or the piezoelectric element 17 satisfies the standard to provide the tactile sensation" may represent either "when the pressure load detected reaches a standard value to provide the tactile sensation", "when the pressure load detected exceeds the standard value to provide the tactile sensation", or "when the standard value to provide the tactile sensation is detected based on the output of the load detection unit or the piezoelectric element".

REFERENCE SIGNS LIST 11 touch sensor
11a touch face
12 load detection unit
13 tactile sensation providing unit
14 display unit
15 memory unit
16 control unit
17 piezoelectric element
21 housing
22 insulator
23 upper cover
24 insulator
31 load sensor
32 piezoelectric element

The invention claimed is:

1. A tactile sensation providing apparatus comprising:
a plurality of load detectors configured to detect a pressure load when an object presses by a certain pressure a touch face of a touch sensor configured to detect a touch input, wherein the pressure load differs depending on a pushed position of the object on the touch face;
a vibrator configured to provide a tactile sensation to the object pressing the touch face of the touch sensor; and
a controller configured to control according to the pushed position on the touch face such that the vibrator provides the tactile sensation to the object when the object, applying the certain pressure at which the tactile sensation is to be provided, presses any position on the touch face for providing the tactile sensation, wherein the plurality of load detectors are disposed on a periphery of the touch sensor, the controller is configured to adjust the pressure load detected by the plurality of load detectors according to the pushed position and, when the adjusted pressure load satisfies a standard to provide the tactile sensation, to control the vibrator such that the tactile sensation is provided to the object pressing the touch face, the controller is configured to adjust the pressure load detected by the plurality of load detectors based on adjustment information set according to the pushed position and, when the adjusted pressure load satisfies the standard to provide the tactile sensation, to control the vibrator such that the tactile sensation is provided to the object pressing the touch face, and the touch face has a first area where the set adjustment information is finely changed and a second area where the set adjustment information is less finely changed than the first area.

2. The tactile sensation providing apparatus according to claim 1, wherein the areas to be set with the adjustment information are divided based on a position of the plurality of load detectors.

3. The tactile sensation providing apparatus according to claim 1, wherein the controller adjusts the standard to provide the tactile sensation according to the pushed position and, when the pressure load detected by the plurality of load detectors satisfies the adjusted standard to provide the tactile sensation, controls the vibrator such that the tactile sensation is provided to the object pressing the touch face.

4. The tactile sensation providing apparatus according to claim 1, wherein the controller, when the pressure load detected by the plurality of load detectors satisfies the standard to provide the tactile sensation adjusted according to the pushed position, controls the vibrator such that the tactile sensation is provided to the object pressing the touch face.

5. The tactile sensation providing apparatus according to claim 1, wherein the first area is an area closer to a support member configured to support the touch sensor than the second area.

6. The tactile sensation providing apparatus according to claim 1, wherein the first area is an area closer to a center of a side with the load detector than the second area; and the second area is closer to a center of a side without the load detector than the first area.

7. A control method for a tactile sensation providing apparatus including a plurality of load detectors configured to detect a pressure load when an object presses by a certain pressure a touch face of a touch sensor configured to detect a touch input, wherein the pressure load differs depending on a pushed position of the object on the touch face; and a vibrator configured to provide a tactile sensation to the object pressing the touch face of the touch sensor, the method comprising:

controlling according to the pushed position on the touch face such that the vibrator provides the tactile sensation to the object when the object, applying the certain pressure at which the tactile sensation is to be provided, presses any position with respect to the plurality of load detectors on the touch face for providing the tactile sensation, and adjusting the pressure load detected by the plurality of load detectors according to the pushed position and, when the adjusted pressure load satisfies a standard to provide the tactile sensation, controlling the vibrator such that the tactile sensation is provided to the object pressing the touch face, wherein the plurality of load detectors are disposed on a periphery of the touch sensor, the method comprises adjusting the pressure load detected by the plurality of load detectors based on adjustment information set according to the pushed position and, when the adjusted pressure load satisfies the standard to provide the tactile sensation, controlling the vibrator such that the tactile sensation is provided to the object pressing the touch face, and the touch face has a first area where the set adjustment information is finely changed and a second area where the set adjustment information is less finely changed than the first area.

8. A tactile sensation providing apparatus comprising:

a plurality of piezoelectric elements configured to detect a pressure load when an object presses by a certain pressure a touch face of a touch sensor configured to detect a touch input, wherein the pressure load differs depending on a pushed position of the object on the touch face, and wherein the plurality of piezoelectric elements provides a tactile sensation to the object pressing the touch face of the touch sensor; and a controller configured to control according to the pushed position on the touch face such that the plurality of piezoelectric elements provides the tactile sensation to the object when the object, applying the certain pressure at which the tactile sensation is to be provided, presses any position on the touch face for providing the tactile sensation, wherein the plurality of piezoelectric elements are disposed on a periphery of the touch sensor, the controller is configured to adjust the pressure load detected by the plurality of piezoelectric elements according to the pushed position and, when the adjusted pressure load satisfies a standard to provide the tactile sensation, to control the plurality of piezoelectric elements such that the tactile sensation is provided to the object pressing the touch face, the controller is configured to adjust the pressure load detected by the plurality of piezoelectric elements based on adjustment information set according to the pushed position and, when the adjusted pressure load satisfies the standard to provide the tactile sensation, to control the plurality of piezoelectric elements such that the tactile sensation is provided to the object pressing the touch face, and the touch face has a first area where the set adjustment information is finely changed and a second area where the set adjustment information is less finely changed than the first area.

9. The tactile sensation providing apparatus according to claim 8, wherein the areas to be set with the adjustment information are divided based on a position of the plurality of piezoelectric elements.

10. The tactile sensation providing apparatus according to claim 8, wherein
the controller adjusts the standard to provide the tactile sensation according to the pushed position and, when the pressure load detected by the plurality of piezoelectric elements satisfies the adjusted standard to provide the tactile sensation, controls the plurality of piezoelectric elements such that the tactile sensation is provided to the object pressing the touch face.

11. The tactile sensation providing apparatus according to claim 8, wherein
the controller, when the pressure load detected by the plurality of piezoelectric elements satisfies the standard to provide the tactile sensation adjusted according to the pushed position, controls the plurality of piezoelectric elements such that the tactile sensation is provided to the object pressing the touch face.

12. A control method for a tactile sensation providing apparatus including a plurality of piezoelectric elements configured to detect a pressure load when an object presses by a certain pressure a touch face of a touch sensor for detecting a touch input, wherein the pressure load differs depending on a pushed position of the object on the touch face, and wherein the plurality of piezoelectric elements provides a tactile sensation to the object pressing the touch face of the touch sensor, the method comprising:
controlling according to the pushed position on the touch face such that the plurality of piezoelectric elements provides the tactile sensation to the object when the object, applying a certain pressure at which the tactile sensation is to be provided, presses any position on the touch face for providing the tactile sensation, and
adjusting pressure load detected by the plurality of piezoelectric elements according to the pushed position and, when the adjusted pressure load satisfies a standard to provide the tactile sensation, controlling the plurality of piezoelectric elements such that the tactile sensation is provided to the object pressing the touch face, wherein
the plurality of piezoelectric elements are disposed on a periphery of the touch sensor,
the method comprises adjusting the pressure load detected by the plurality of piezoelectric elements based on adjustment information set according to the pushed position and, when the adjusted pressure load satisfies the standard to provide the tactile sensation, controlling the plurality of piezoelectric elements such that the tactile sensation is provided to the object pressing the touch face, and
the touch face has a first area where the set adjustment information is finely changed and a second area where the set adjustment information is less finely changed than the first area.

* * * * *